(12) United States Patent
Balasaygun et al.

(10) Patent No.: US 9,602,670 B2
(45) Date of Patent: Mar. 21, 2017

(54) METHODS AND SYSTEMS FOR SELECTIVELY SHARING CONTENT

(75) Inventors: Mehmet C. Balasaygun, Freehold, NJ (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 766 days.

(21) Appl. No.: 12/916,082

(22) Filed: Oct. 29, 2010

(65) Prior Publication Data
US 2012/0110196 A1 May 3, 2012

(51) Int. Cl.
| | | |
|---|---|---|
| G06F 15/16 | (2006.01) | |
| H04M 3/56 | (2006.01) | |
| H04L 12/18 | (2006.01) | |
| G06Q 10/10 | (2012.01) | |
| H04L 29/06 | (2006.01) | |
| H04N 7/15 | (2006.01) | |

(52) U.S. Cl.
CPC ........... *H04M 3/567* (2013.01); *G06Q 10/10* (2013.01); *H04L 12/1818* (2013.01); *H04L 65/403* (2013.01); *H04N 7/15* (2013.01)

(58) Field of Classification Search
CPC .. H04M 3/567; H04L 12/1818; H04L 65/403; H04N 7/15; G06Q 10/10
USPC ....................................................... 709/228
See application file for complete search history.

(56) References Cited

U.S. PATENT DOCUMENTS

| | | | | |
|---|---|---|---|---|
| 2005/0102360 | A1* | 5/2005 | Chavis | G06F 9/4443 709/205 |
| 2007/0180029 | A1* | 8/2007 | Croak | H04M 3/567 709/204 |
| 2007/0299710 | A1* | 12/2007 | Haveliwala | G06Q 10/10 705/7.19 |
| 2009/0216835 | A1* | 8/2009 | Jain | G06Q 10/10 709/204 |
| 2011/0099006 | A1* | 4/2011 | Sundararaman | G10L 15/26 704/208 |
| 2012/0089928 | A1* | 4/2012 | Bryant | G06Q 10/10 715/753 |

* cited by examiner

*Primary Examiner* — Suraj Joshi
*Assistant Examiner* — Jaren M Means (57) ABSTRACT

A method for sharing content with participants in a conference including establishing a network conference session, identifying restricted content to be shared, and identifying global content which is a subset of the restricted content. The method further includes the steps of identifying a global participant group for the network conference session wherein members of the global participant group attend the network conference session using one or more communication devices, identifying a restricted participant group for the network conference session wherein members of the restricted participant group attend the network conference session using one or more communication devices, transmitting the restricted content to the restricted participant group, and transmitting the global content to the global participant group.

21 Claims, 7 Drawing Sheets

METHODS AND SYSTEMS FOR SELECTIVELY SHARING CONTENT

TECHNICAL BACKGROUND

Audio conferencing enables tens, hundreds, or even thousands of participants to listen to a presentation from remote locations by telephone. The availability of the internet and high speed internet connections has led to further technological advancements in meeting and network conference session technology. It is now common for participants in a meeting to remotely view visual content being presented in a network conference session through a computer with an internet connection. The presenter transmits his visual content using specialized software or a web-based service and participants who have been given permission are allowed to view that visual content in real time, or near real time, over an internet connection.

Presentations may include both audio and visual content. The audio content may be transmitted through a separate audio conference as described above or may be included in the internet based transmission along with the visual content. As the use of electronic network conference sessions of this type become more commonplace, the breadth of content being communicated increases and the variety of participants expands as well.

OVERVIEW

In various embodiments, systems and methods are disclosed for sharing content with participants in a conference. In an embodiment, a method includes establishing a network conference session, identifying restricted content to be shared, and identifying global content which is a subset of the restricted content. The method further includes the steps of identifying a global participant group for the network conference session wherein members of the global participant group attend the network conference session using one or more communication devices, identifying a restricted participant group for the network conference session wherein members of the restricted participant group attend the network conference session using one or more communication devices, transmitting the restricted content to the restricted participant group, and transmitting the global content to the global participant group. In variations of this embodiment, the restricted content is visual content, audio content, or both.

In another embodiment, the members of the participant groups receive different invitations to the network conference session. The invitations contain information which identifies the recipient as a member of the restricted participant group or the global participant group.

In another embodiment, a host of a network conference session selectively mutes audio content which is being shared in the conference using a control feature included in the software which is used to manage the network conference session.

DETAILED DESCRIPTION

FIGS. 1-7 and the following description depict specific embodiments of the invention to teach those skilled in the art how to make and use the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will also appreciate that the features described below can be combined in various ways to form multiple variations of the invention. As a result, the invention is not limited to the specific embodiments described below, but only by the claims and their equivalents.

Presenters often use computers and computer software to assist in presenting information to meeting participants. The computers and computer software are often used in conjunction with various other display and communication technologies. Computer software dedicated to these purposes assists the presenter in many areas including: creation of the content, saving the content for later use, organizing the content, laying out the content in an easily understandable format, and sequencing through the content during a presentation. Examples of this type of software are Microsoft PowerPoint and Apple Keynote. The content is usually laid out in these types of programs in the form of presentation slides. Presenters also often wish to include speaking notes which remind them of points to discuss while presenting the content.

The availability of the internet and high speed internet connections has led to further technological advancements in meeting and network conference session technology. It is now common for participants in a meeting to remotely view the content being presented in a network conference session through a computer with an internet connection. The presenter transmits the content he is presenting using specialized software or a web-based service and participants who have been given permission are allowed to view that content in real time, or near real time, over an internet connection. The presentation also often includes audio content which may be transmitted over the internet in conjunction with the visual content or may be separately transmitted over a telephone connection as discussed above.

As the use of electronic network conference sessions becomes more commonplace, the breadth of content being communicated increases and the variety of participants expands as well. These types of conferences are often used for government or business meetings where sensitive or proprietary information is being communicated. Some network conference sessions involve a wide range of participants who are attending in different roles or capacities. For example, a presenter may be making a sales presentation to potential clients. In addition to the potential clients, other members of presenter's company may be attending the network conference session. In a single presentation, the presenter may wish to share different sets of content with these two groups of people. In other words, the presenter may want the sales presentation to the potential clients to include certain visual content but may also want the internal members of his company to see additional visual content which is proprietary or sensitive.

In another example, a presenter may be presenting a company earnings announcement to a large audience. The audience may include news reporters, financial analysts, the public, partner companies, internal company personnel, as well as others. There may be various levels of proprietary and sensitive content within the presentation and the presenter may want to tailor the content by limiting which participants, or groups of participants, receive which types of content. In addition, the presenter may have his own speaking notes included in the presentation materials to refresh his memory while speaking. The presenter would like to see those notes as he is working through the presentation content but does not want those notes to be transmitted in the versions of the content which are transmitted and displayed to all the other conference participants.

A presenter could resolve the problems discussed above by holding separate network conference sessions for each of the groups of participants with whom he wishes to share content. However, there are several problems with this approach. First, it is time consuming and inefficient for the presenter to have duplicative network conference sessions. Second, it does not allow the content which is common to all participants to be received by those participants at the same point in time. This timing can be important when it pertains to financial markets or for other reasons. Finally, a presenter who holds multiple conference sessions will always have the challenge of trying to present the content which is common to all participants in exactly the same manner such that the participants get the same message with respect to that common content.

With respect to electronically shared computer data, the presenter can also solve the problems above by managing several different sets of presentation content during the network conference session. The presenter must create and manage different sets of content which contain appropriate content for that group. Separate interfaces to each of the participant groups must be managed to make sure that only the proper participants are admitted to each group, only the proper version of the content is sent out to each group, and to make sure that information is updated on each of the interfaces each time the presenter moves on to new content. Due to these complications, the approaches which involve managing multiple sets of content targeted for different participant groups are tedious and error prone.

For the reasons discussed above, it is desirable for a presenter to be able to share a single set of content with various participant groups allowing each of those participant groups to only see or receive a specified subset of the content. Using this approach, the presenter is able to step through a single set of content and share that content knowing that each participant group will only receive the set of content tailored to him while only having to manage one set of content himself.

Figure 1:
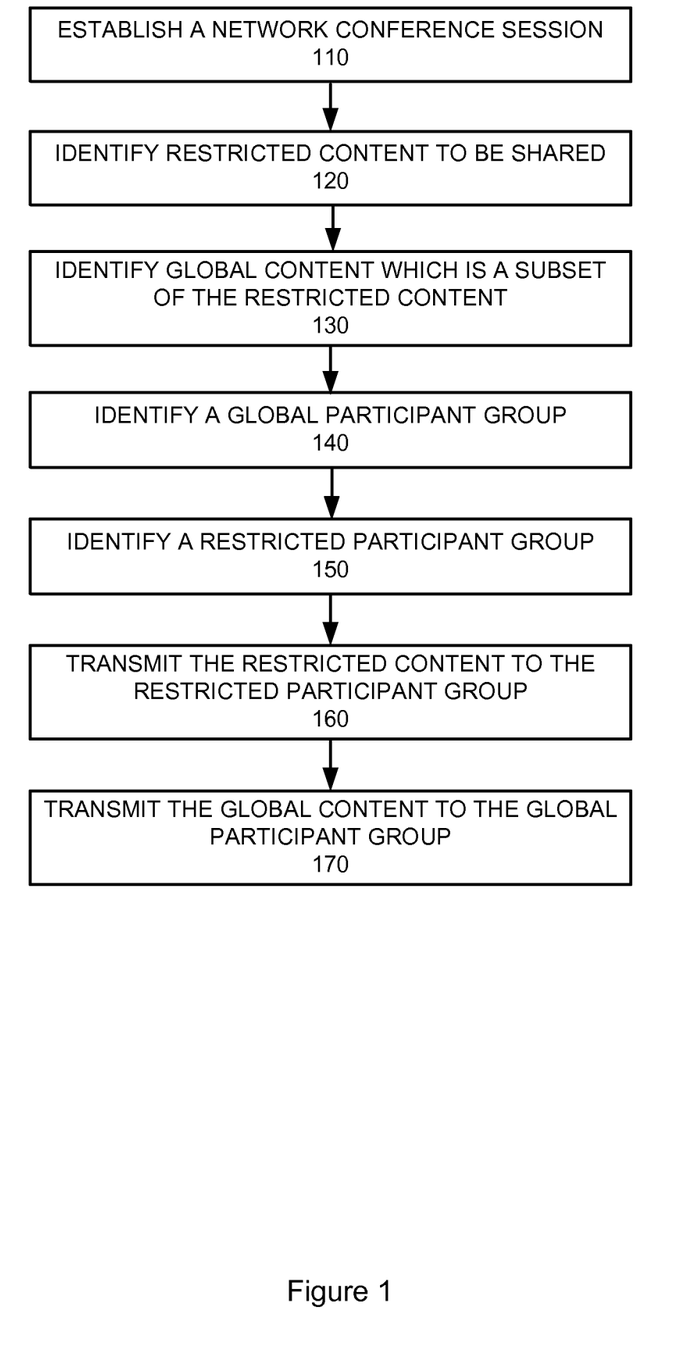
FIG. 1 illustrates a method of sharing content with participants in a network conference session.

FIG. 1 illustrates a method of sharing content with participants in a network conference session. The method involves establishing a network conference session (step 110), identifying restricted content to be shared (step 120), and identifying global content which is a subset of the restricted content (step 130). The method further includes identifying a global participant group for the network conference session wherein members of the global participant group attend the network conference session using one or more communication devices (step 140) and identifying a restricted participant group for the network conference session wherein members of the restricted participant group also attend the network conference session using one or more communication devices (step 150). Finally, the restricted content is transmitted to the restricted participant group (step 160) and the global content is transmitted to the global participant group (step 170).

Figure 2:
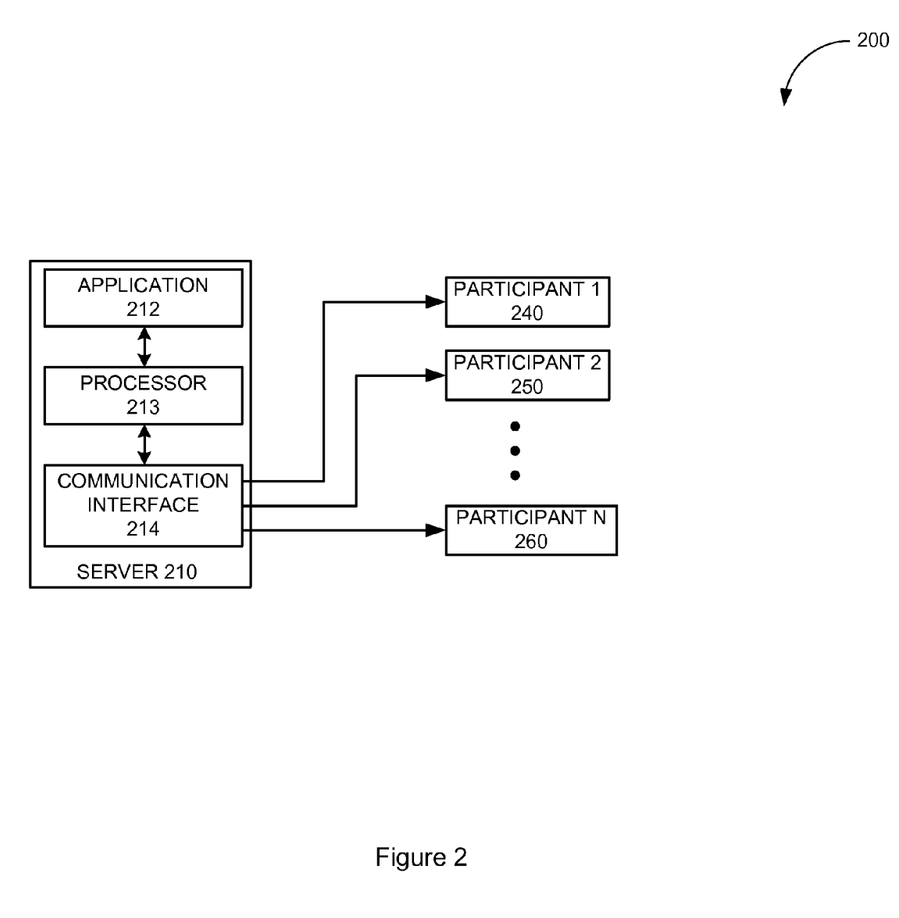
FIG. 2 illustrates a communication system for sharing content in a network conference session.

FIG. 2 illustrates a communication system for sharing content with participants in a network conference session using the method provided in FIG. 1. Communication system 200 comprises server 210 and multiple network conference session participants. Server 210 is used to share the presentation content with the participants by means of the network conference session. Server 210 may be operated by the presenter or by a conference host who is assisting the presenter.

Server 210 may be any of a variety of types of computers or computer systems and is comprised of processor 213, application 212, and communication interface 214. Application 212 may be any type of computer software or computer program configured to open, manipulate, display, or otherwise process the content a presenter wishes to share. Application 212 runs on processor 213. Application 212 identifies restricted content which will only be shared with a select group of participants. In addition to other tasks, application 212 also identifies global content which is a subset of the restricted content and will be shared with a broader group of participants. The global content has some information removed based on a desire to not share the removed information with some of the conference participants. Next, the system determines a global participant group and a restricted participant group. Members of both groups will attend the network conference session using one or more communication devices.

Based on the identifications made by application 212, processor 213 provides content to communication interface 214 with instructions about how the content is to be shared. Communication interface 214 transmits the restricted content to the restricted participant group and transmits the global content to the global participant group. Each of participant 1 240, participant 2 250, and participant N 260 receive either the restricted content or the global content depending on whether each is identified as being a member of the restricted participant group or the global participant group.

In one example, the global participant group may include participant 1 230 and participant N 260 while the restricted participant group includes only participant 2 250. Participant 2 250 will receive the restricted content which may include proprietary or sensitive information which the presenter does not want the other participants to receive. The global participant group, which includes participant 1 240 and participant N 260 in this example, will receive global content which is a subset of the restricted content. The global content has the proprietary or sensitive information removed making it more appropriate for transmission to the broader audience. In a further example, a participant may also receive no content if that participant has not been identified as a member of either group.

Figure 3:
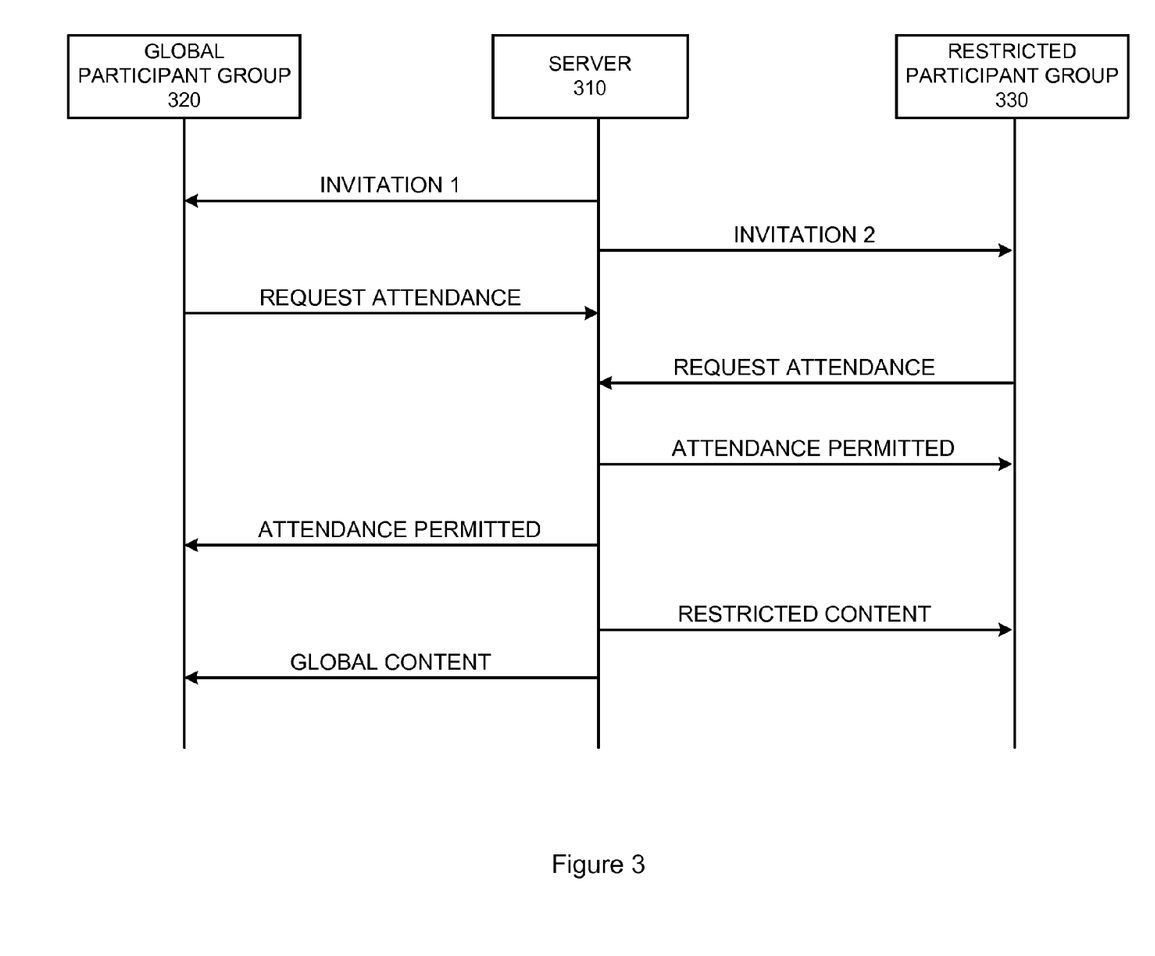
FIG. 3 illustrates a method of sharing content with participants in a network conference session.

FIG. 3 illustrates a method of sharing content with participants in a network conference session where invitations are used. As described with respect to FIGS. 1 and 2, participant groups are identified based on the type of content a presenter wishes to share with each group. The distinction between types of content may be made based on whether the information is confidential, proprietary, sensitive, or for internal use only. The distinction could also be made based on the level of detail the presenter wishes to share with various members of the group. The distinction could also be based on other factors.

Once the participant groups are identified, meeting invitations are sent to each member of each participant group. Server 310 may communicate with members of the participant groups through at least one of a variety of means including an internet connection, instant messaging, or email. In this example, server 310 sends invitation 1 to all member of global participant group 320 and sends invitation 2 to all members of restricted participant group 330. Each member of each participant group sends a request to attend the meeting based on the previously received invitation. The invitation may include identifying information such as a meeting number, an identification number, a password, or a unique internet browser link.

Each of the requests to attend the conference session contains information from the original invitation identifying the requester as a member of the global or the restricted participant group. In this way, a participant only has sufficient information to successfully request attendance at the conference as a member of the participant group for which that participant was originally sent an invitation.

Upon receipt of an attendance request message, server 310 determines if the requester is allowed to attend the network conference session in that capacity. If yes, server 310 sends a response message indicating that attendance is permitted. Each participant may or may not be aware that there are different classifications of participant groups and may or may not be aware of the group classification for which he has been admitted.

Once the network conference session is established and one or more participants have been admitted, a presenter begins making a presentation and sharing content. Server 310 performs this task by transmitting the appropriate content to the members of each participant group. At the command of the presenter or the host of the network conference session, server 310 transmits the global content to the members of global participant group 320 and transmits the restricted content to the members of restricted participant group 330. As the network conference session progresses and the presenter covers new content, this new content is sent to members of each participant group as described above.

From the presenter's standpoint, he is dealing with one set of content. He steps through that single set of content and presents that content knowing that when the content is electronically transmitted to the participants it will be appropriately filtered based on group membership. The filtering process which makes the distinction between the two categories of content may be accomplished using metatags, metadata, or other types of indicators or flags embedded in the content. The tags provide an indication as to whether a particular element of the content should be included in both global content and restricted content or only in the more limited category of restricted content. During the network conference session, software running on server 310 manages the process of identifying these distinctions and sending out the proper content to the proper recipients.

As a variation of the example described above, the network conference session presenter or host may also communicate with server 310 remotely. In that configuration, the presenter or host sends instructions to server 310 through using a local computer which communicates through at least one of a variety of communication links which may be an internet connection. The processes through which the participant groups are identified, the content is parsed, and the global and restricted content identified, may be accomplished either on the local computer or on server 310.

Figure 4:
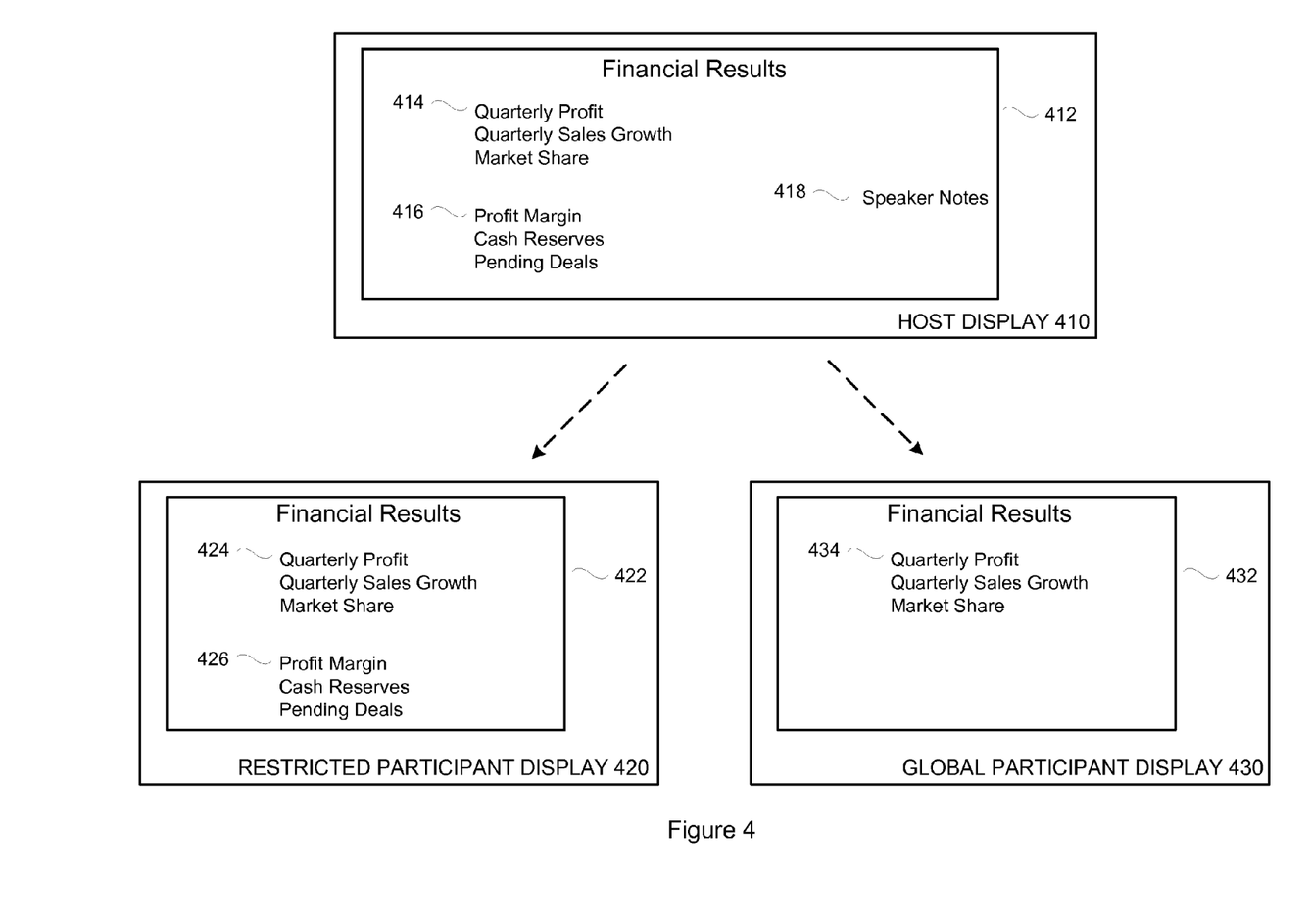
FIG. 4 illustrates an example of shared content.

FIG. 4 illustrates an example of content which is shared with a member of the restricted participant group and a member of the global participant group. In FIG. 4, host display 410 depicts a monitor or display screen associated with server 210 of FIG. 2 or server 310 of FIG. 3. The presenter or host in the network conference session uses host display 410 to guide the discussion and presentation of the content. Application window 412 is a software window associated with the specific application the user is using to present the content. Application window 412 displays the specific information content which the presenter is sharing in the network conference session. Application window 412 may be the display window of a software program designed for making presentations such as Microsoft PowerPoint, Apple Keynote, or other similar program.

Continuing with the example of FIG. 4, application window 412 is displaying a presentation slide entitled 'Financial Results.' The content in the slide is broken down into three categories of content represented by content 414, content 416, and speaker notes 418. Additional software tools are used to communicate the displayed content to the meeting participants. Examples of these additional software tools are NetMeeting and WebEx. The content displayed in application window 412 may be sent to the participants in a single transmission or it may be sent in small pieces as the presenter discusses each particular element of the content.

Restricted participant display 420 of FIG. 4 illustrates a monitor on which a member of the restricted participant group may be viewing the network conference session. Similar to host display 410, restricted participant display 420 includes a restricted participant software application window 422 which displays content transmitted by server 310. In this example, the restricted participant receives and displays content 424 and content 426 which correspond to content 414 and content 416, respectively, from the host display. However, speaker notes 418 are not transmitted to or displayed in restricted participant software application window 422.

Global participant display 430 of FIG. 4 illustrates a monitor on which a member of the global participant group may be viewing the network conference session. Similar to restricted participant display 420, global participant display 430 includes a global participant software application window 432 which displays content transmitted by server 310. In this example, the global participant receives and displays content 434 which corresponds to content 414 from the host display. The members of the global participant group represent a broader audience and, in this case, do not have privileges to receive content represented by content 416 or speaker notes 418.

Even though the presenter is working with a single set of presentation content, server 310 parses the content and transmits different variations of that content to members of the restricted participant group and the global participant group as illustrated in FIGS. 1 and 4. In this way, the presenter is able to provide separate sets of content to members of the two groups without having to manually manage the two sets of content or work with two presentation files.

Figure 5:
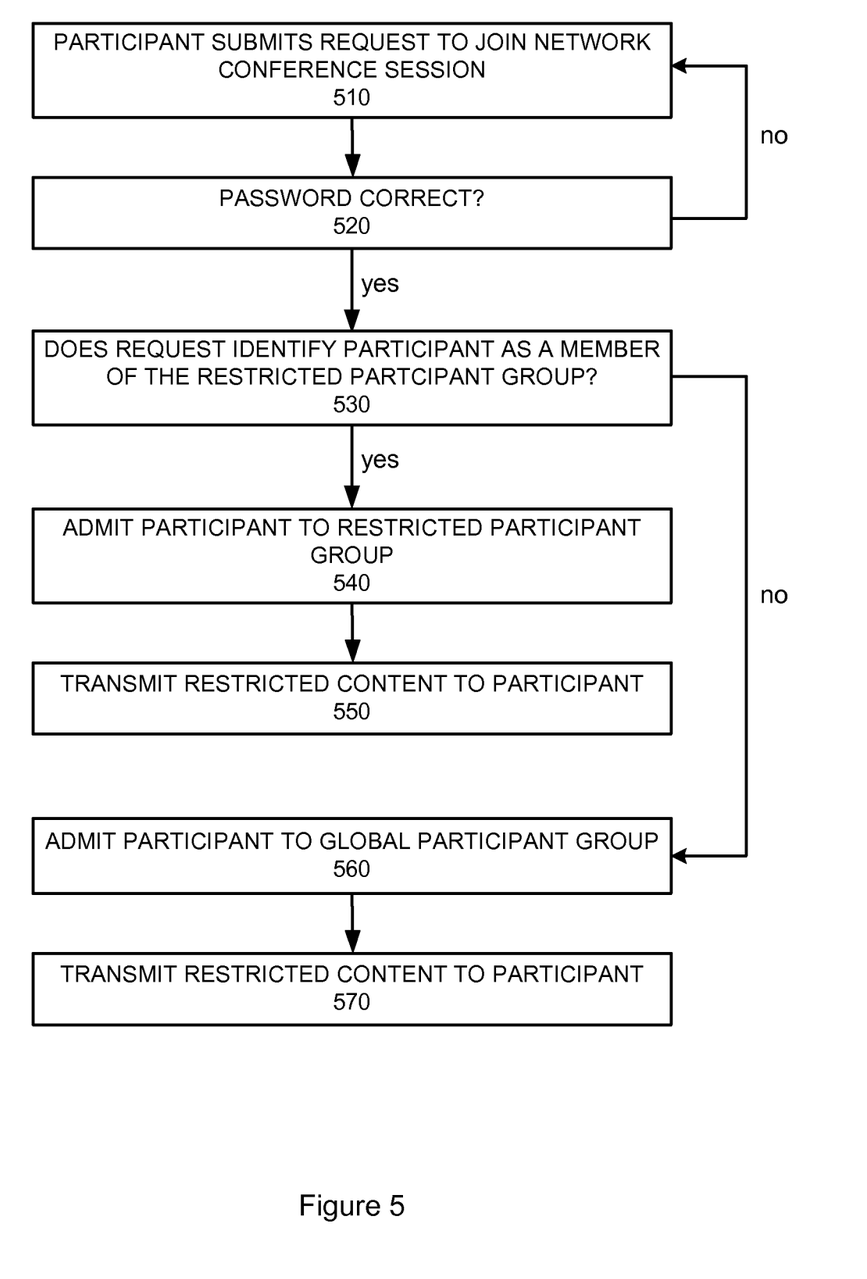
FIG. 5 illustrates a method of sharing content with participants in a network conference session.

FIG. 5 illustrates a method of sharing content with participants in a network conference session. In this embodiment, participants have a password which is used to enter the network conference session. Additional information is included in the request to join the session which indicates whether the participant will become a member of the restricted participant group. The participant submits a request to joint the network conference session using a password (step 510). If the password is correct, a determination is made as to whether the request contains information identifying the participant as a member of the restricted participant group (steps 520 and 530). The request may identify the participant as a member of the restricted participant group in a number of ways including an additional password, embedded security keys, a unique Universal Resource Locator (URL), an identification number, or by other means.

If proper identifying information is included, the participant is admitted to the restricted participant group (step 540) and restricted content is transmitted to that participant (step 550). If the participant is not identified as a member of the restricted participant group, the participant is admitted to the global participant group (step 560) and global content is transmitted to that participant (step 570). In a variation of the method described above, a participant may be admitted to the global participant group by default and may not required to provide specific identifying information or credentials to become a participant of that group.

Figure 6:
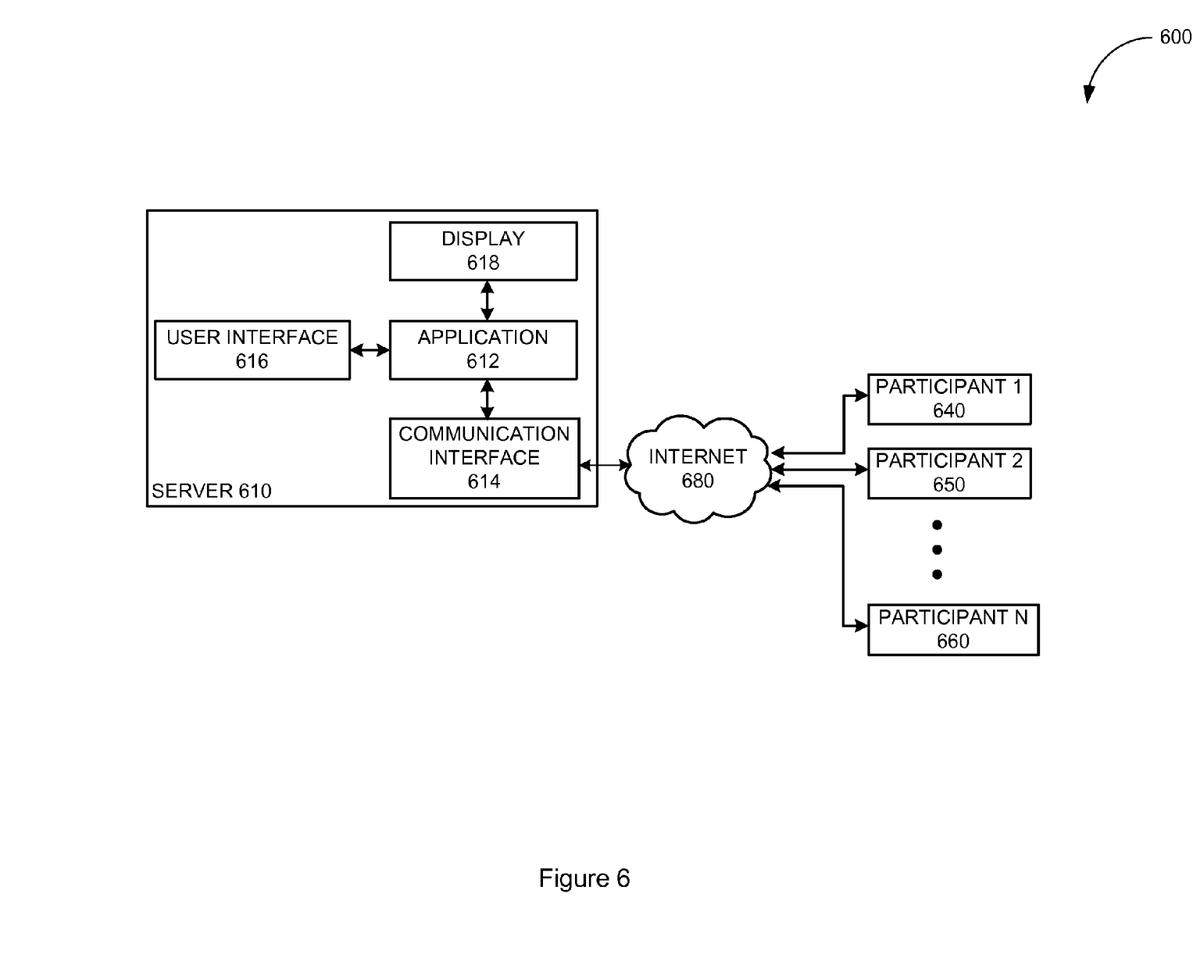
FIG. 6 illustrates a communication system for sharing content in a network conference session.

FIG. 6 illustrates an embodiment of a communication system for sharing content with conference participants. Communication system 600 comprises server 610, internet 680, and multiple network conference session participants. Server 610 manages content which is being shared with the participants in the network conference. Server 610 may be operated by the presenter or by a conference host on behalf of the presenter.

Server 610 may be any of a variety of types of computers or computer systems and is comprised of application 612, communication interface 614, user interface 616, and display 618. Application 612 may be any type of computer software or computer program configured to open, manipulate, display, or otherwise process the content a presenter wishes to share. Application 612 identifies restricted content which will only be shared with a select group of participants. Application 612 also identifies global content which is a subset of the restricted content and will be shared with a broader group of participants. The global content has some content removed which is based on a desire to not share the removed information with some of the participants. Next, server 610 identifies a global participant group and a restricted participant group. Members of both groups will attend the network conference session using one or more communication devices. It should be understood that the group of all participants may be broken into more than two participant groups each receiving different sets of content. Server 610 accomplishes the functions described above under the direction of a user who interfaces with server 610 by means of user interface 616 and display 618.

Application 612 provides content to communication interface 614 with instructions about how the content is to be shared. Communication interface 614 and each of participant 1 640, participant 2 650, and participant N 660 are connected to internet 680. Each of the participants is a member of either the restricted participant group or the global participant group. Communication interface 614 transmits the restricted content to the restricted participant group through internet 680 and transmits the global content to the global participant group through internet 680. Alternatively, a participant may receive nothing if that participant has not been identified as a member of either group. In the example of FIG. 6, the content which is transmitted to the participants over internet 680 may comprise visual content, audio content, or a combination of both audio and visual content. Visual content may comprise pictures, video, presentation slides, screen shots, documents, or other types of computer files. It should be understood that internet 680 may also be another type of network including a proprietary network, an intra company network, a wireless network, or other types of network, including combinations thereof.

In the example of FIG. 6, there are different approaches as to how the global content and restricted content may be shared with the participants. In one approach, application 612 may contain two different sets of content, one global and one restricted, which both get sent to the appropriate participants through communication interface 614. Alternatively, application 612 may contain only a single set of content and send out the appropriate subsets of that content to the appropriate participants. In yet another approach, application 612 may send the same set of restricted content to all participants. In this case, a software application running on each participant's communication device performs a filtering process and allows only the appropriate information to be displayed based on the identity of the participant.

In a further variation of the example embodiments discussed above, the members of each participant group may be enabled to amend the content based on their group membership. In other words, in this example, members of the global participant group are enabled to amend the global content. Either alternatively or at the same time, members of the restricted group may be enabled to amend the restricted content. In this way, the members of each group are enabled or given permission to amend only the visual content which is applicable to them.

Amending the content may involve interacting with the content in a number of ways including modifying the content, adding content, deleting content, or adding notes to the content. These permissions may also apply to the audio content in a similar manner. Using this approach, only members of the appropriate group are enabled to contribute audio content when the audio content being presented is associated with the group they are members of. Similar functions may also be used to control which participants can present additional content.

Figure 7:
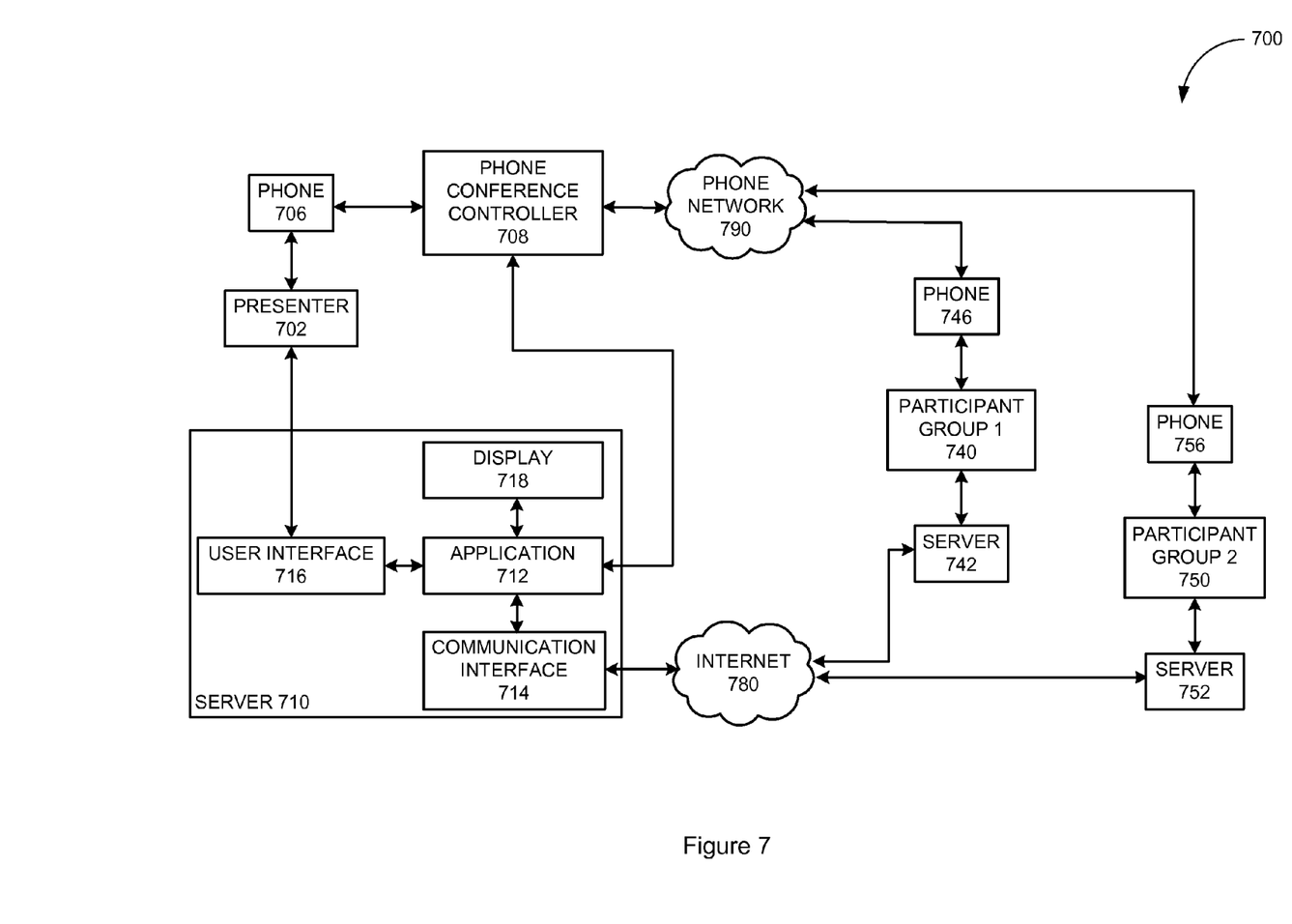
FIG. 7 illustrates a communication system for sharing content in a network conference session.

FIG. 7 illustrates another embodiment of a communication system for sharing content with participants. The communication system of FIG. 7 is capable of hosting a network conference session in which both audio and visual data are transmitted to participants over separate networks.

In FIG. 7, server 710 manages content which is being shared with the participants by means of a network conference session. Server 710 may be any of a variety of types of computers or computer systems and is comprised of application 712, communication interface 714, user interface 716, and display 718. Application 712 may be any type of computer software or program configured to open, manipulate, display, or otherwise process the content a presenter wishes to share. Application 712 identifies restricted content which will only be shared with a select group of participants. Application 712 also identifies global content which is a subset of the restricted content and will be shared with a broader group of participants. Presenter 702 provides configuration and operation input to server 710 through user interface 716. Using this input, server 710 determines a global participant group and a restricted participant group.

Application 712 provides visual content to communication interface 714 with instructions about how the content is to be shared. Communication interface 714, server 742, and server 752 are connected to internet 780. Participant group 1 740 and participant group 2 750 are connected to server 742 and server 752 respectively. In this example, participant group 1 740 is a restricted participant group and participant group 2 750 is a global participant group. Communication interface 714 transmits the restricted content to server 742 and transmits the global content to server 752 through internet 780. Server 742 and server 752 make the visual content available to their respective participant groups. In a variation of this embodiment, server 742 and server 752 may be implemented within a single server.

In the implementation of FIG. 7, audio content is also transmitted to the participant groups as part of the network conference session. Presenter 702 uses phone 706 to communicate audio information over phone network 790. Phone conference controller 708 controls the phone conference by allowing participants to join the call, selectively controlling which participants receive audio content, and other functions. Phone conference controller 708 may be implemented in hardware, software, or both. Members of participant group 1 740 and members of participant group 2 750 use phones 746 and 756, respectively, to receive the audio content transferred over phone network 790. The methods by which participants are invited and allowed into the network conference session are similar to those described in previous figures and embodiments with respect to the connections over which visual content is received. The methods by which participants of the restricted and global participant groups are distinguished with respect to the audio content are similar to those described in previous figures and embodiments with respect to the connections over which visual content is received.

In the system of FIG. 7, a presenter simultaneously transmits visual content over internet 780 and audio content over phone network 790. In this implementation, presenter 702 or a conference host operating server 710 may selectively mute the audio information to a select group of the conference participants using a control feature included in software application 712. The control feature in software application 712 communicates with phone conference controller 708 to selectively control which recipients receive which audio content. In this way, any audio content which is associated with restricted visual content will be delivered only to the restricted participant group. This can be accomplished through a single control function because the members of the participant groups are already defined within server 710 by application 712. In other words, this software control feature allows the presenter or host to prohibit members of the global participant group from receiving restricted audio content in a manner analogous to the method by which the visual content is limited as described in previous sections.

The selective muting of audio content not included in the global content may be accomplished in several manners. The muting could be accomplished through a manual process in which the presenter or host selects the mute function at appropriate times during the presentation. It may also be accomplished through more automated means in which software functions within application 712 track which content is being presented and mute the audio transmission accordingly. The software may perform this tracking through speech analytics which determine the content being discussed, through metadata which is embedded in the content, by monitoring which slide in a presentation is being presented, or through other means.

It should also be understood that three or more different participant groups may exist in each of the examples described above. In the case of three or more participant groups, each group receives different variations or subsets of the content based on what the presenter wishes to share with each of those groups. The content shared with a particular group may be a subset of the content shared with other groups or may be different content altogether. The content is distributed to each of the three participant groups as previously described and illustrated in FIGS. 1-7.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of sharing content with participants in a network conference session, the method comprising:
   establishing a network conference session;
   during the network conference session:
      receiving conference content currently being displayed in an application window to a presenter of the network conference session, wherein the conference content includes speaking notes currently being displayed to the presenter;
      transmitting restricted content, comprising a subset of the conference content that does not include the speaking notes, to a restricted participant group for display to the restricted participant group contemporaneously with the conference content currently being displayed to the presenter; and
      transmitting global content, comprising a subset of the restricted content, to a global participant group for display to the global participant group contemporaneously with the conference content currently being displayed to the presenter.

2. The method of claim 1 wherein the restricted content comprises audio information.

3. The method of claim 2 further comprising selectively muting the audio information, resulting in muted audio.

4. The method of claim 3 wherein the muted audio corresponds to content not included in the global content.

5. The method of claim 1 further comprising members of the global participant group and members of the restricted participant group receiving different invitations to the network conference session.

6. The method of claim 1 further comprising assigning each of the participants an identifier indicating membership in either the global participant group or the restricted participant group.

7. The method of claim 1 further comprising enabling members of the global participant group to amend the global content and enabling members of the restricted participant group to amend the restricted content.

8. A network conferencing server for sharing content with participants, the network conferencing server comprising:
   a processor configured to establish a network conference session;
   an application configured to:
      during the network conference session, receive conference content currently being displayed in an application window to a presenter of the network conference session, wherein the conference content includes speaking notes currently being displayed to the presenter;

a communication interface configured to:
during the network conference session, transmit restricted content, comprising a subset of the conference content that does not include the speaking notes, to a restricted participant group for display to the restricted participant group contemporaneously with the conference content currently being displayed to the presenter and transmit global content, comprising a subset of the restricted content, to a global participant group for display to the global participant group contemporaneously with the conference content currently being displayed to the presenter.

9. The network conferencing server of claim 8 wherein the restricted content comprises visual information presented on a display device.

10. The network conferencing server of claim 8 wherein the restricted content comprises audio information.

11. The network conferencing server of claim 10 wherein the audio information is selectively muted, resulting in muted audio.

12. The network conferencing server of claim 11 wherein the muted audio corresponds to content not included in the global content.

13. The network conferencing server of claim 8 wherein members of the global participant group and members of the restricted participant group receive different invitations to the network conference session.

14. The network conferencing server of claim 8 wherein members of the global participant group are enabled to amend the global content and members of the restricted participant group are enabled to amend the restricted content.

15. A software product for conducting a network conference session for participants, the software product comprising:
software operational when executed by a processor to direct the processor to establish a network conference session, during the network conference session, receiving conference content currently being displayed in an application window to a presenter of the network conference session, wherein the conference content includes speaking notes currently being displayed to the presenter, and to direct a communication interface to transmit restricted content, comprising a subset of the conference content that does not include the speaking notes, to a restricted participant group for display to the restricted participant group contemporaneously with the conference content currently being displayed to the presenter and transmit global content, comprising a subset of the restricted content, to a global participant group for display to the global participant group contemporaneously with the conference content currently being displayed to the presenter; and a non-transitory storage medium configured to store the software.

16. The software product of claim 15 wherein the restricted content comprises visual information presented on a display device.

17. The software product of claim 15 wherein the restricted content comprises audio information.

18. The software product of claim 17 wherein the audio information is selectively muted, resulting in muted audio.

19. The software product of claim 18 wherein the muted audio corresponds to content not included in the global content.

20. The software product of claim 15 wherein members of the global participant group and members of the restricted participant group receive different invitations to the network conference session.

21. The software product of claim 15 wherein members of the global participant group are enabled to amend the global content and members of the restricted participant group are enabled to amend the restricted content.

* * * * *